Dec. 12, 1933. J. E. CONKLIN 1,939,204
RUBBER FAUCET CONNECTION
Filed Dec. 10, 1931
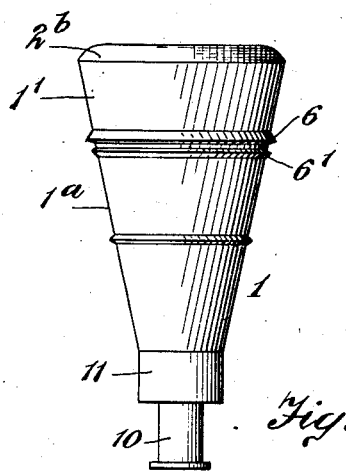
Fig. 1
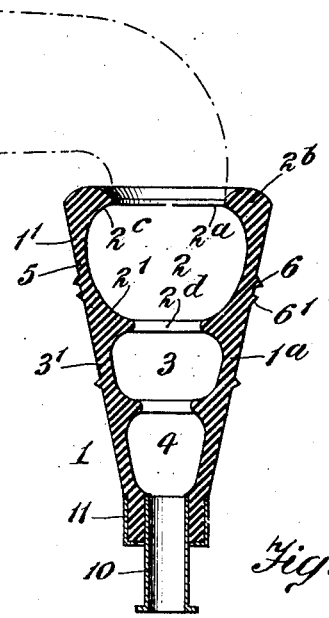
Fig. 2
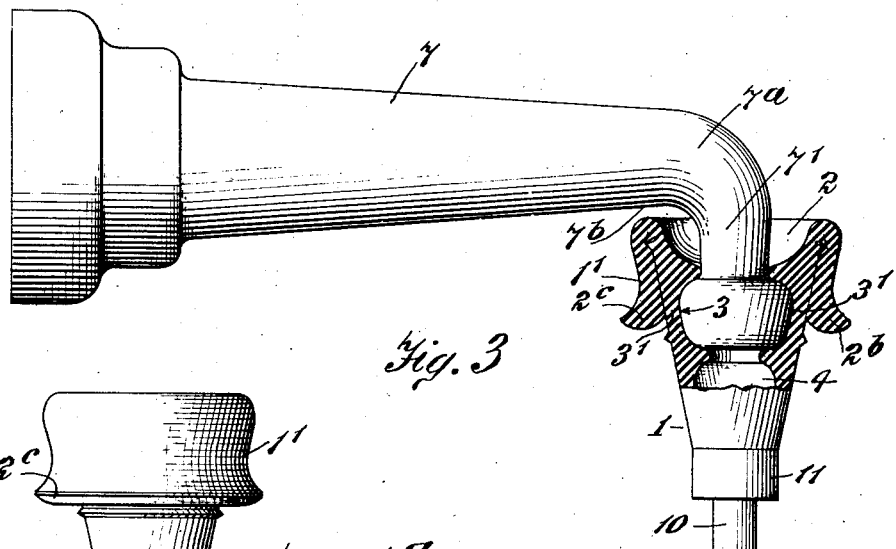
Fig. 3
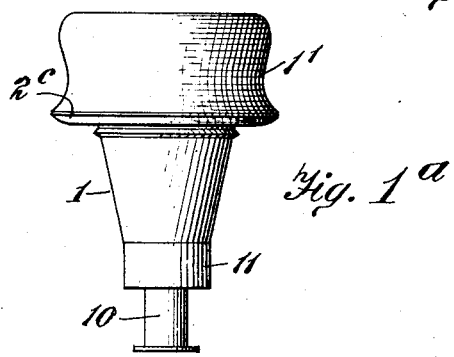
Fig. 1ª
INVENTOR
JOHN EDWARD CONKLIN
BY
ATTORNEY Patented Dec. 12, 1933

1,939,204

UNITED STATES PATENT OFFICE 1,939,204

RUBBER FAUCET CONNECTION

John Edward Conklin, Brooklyn, N. Y.

Application December 10, 1931
Serial No. 580,051

4 Claims. (Cl. 285—90)

This invention relates to improvements in rubber faucet connections, and is an improvement upon the faucet connection patented by Letters Patent No. 1,681,382, issued to me August 21st, 1928.

Rubber faucet connections or couplings of the type under consideration are subjected to considerable strain or pressure when a spray head, spray nozzle or spray brush is in use by a bather, and great difficulty has heretofore been experienced in preventing the faucet connection from slipping off the faucet, particularly where the faucet connection is adapted to be applied to varying sizes of faucets. It is one of the objects of this invention to produce a faucet connection of soft rubber which will be capable of quick and ready application to faucets of varying sizes and will also have a gripping or binding action on the faucet which will not be loosened or released when the spray tube attached to the spray head is being handled or when the spray head, brush or nozzle is being used.

Another object of my invention is to produce a soft rubber faucet connection having a plurality of faucet seats of varying sizes and which will have a foldable section or portion capable of changing the length of the element and of converting a portion of a wall of one of the faucet seats into an external collar so as to vary the relative positions of the faucet seats; to produce a connection which will provide a plurality of tops for the connection and enable close approach of plurality of faucet seats in a connection to the bent portions of faucets, thus producing closer connection to be obtained between the faucet seats in said connection and the faucets which they are intended to fit; to provide a connection having an elastic, foldable faucet seat portion which will, by an unfolding thereof, enable a tighter and closer fit to be obtained between the foldable seat and one of the faucets which said seat element is adapted to fit; to provide in a faucet connection a faucet seat having a foldable wall portion which, in folded position, will reinforce the walls of another faucet seat in the faucet connection; to provide a faucet connection of frustro-conical conformation which will have a relatively large faucet seat provided with a relatively thin elastic wall portion disposed above a thicker wall portion preferably having a reinforcing rib on the outer surface, whereby the upper half of the wall of a larger faucet seat will be capable of being turned down or folded to cause the outer surface thereof to surround and engage the outer surface of the wall of a smaller faucet seat in said faucet connection.

With these and other objects in view, the invention comprises the combination of members and arrangement of parts so combined as to co-act and co-operate with each other in the performance of the functions and the accomplishment of the results herein contemplated, and comprises in one of its adaptations, the species or preferred form illustrated in the accompanying drawing, in which:—

Fig. 1 is a view in side elevation of a rubber faucet connection embodying my invention with the foldable top section in unfolded position;

Fig. 1A is a view of the rubber faucet connection shown in Fig. 1 with the foldable top section folded down;

Fig. 2 is a vertical section of my faucet connection shown in Figs. 1 and 1A with the foldable top section extended upwardly to fit tightly and to grip a faucet head or outlet portion of a relatively large faucet;

Fig. 3 is a view partly in side elevation and partly in vertical section showing my faucet connection mounted on a smaller faucet connection and showing the foldable section in folded position.

Referring now to the drawing which illustrates a preferred embodiment of my invention, 1 indicates a faucet connection composed of soft and flexible rubber which is hollow and frustro-conical in conformation and as shown in Fig. 3 is provided with three faucet seats, 2, 3 and 4, respectively. The faucet seat 2 is adapted to receive and provide for secure attachment to the nozzle or head of faucets of large size, which are at present very commonly employed because of the speed by which a bathtub may be filled therefrom with water. The faucet seat 3 is adapted to receive and permit secure attachment to faucet heads of intermediate size which are still commonly in use, and the faucet seat 4 is adapted to receive and fit over faucet heads or nozzles of still smaller size which are also still found in use.

In accordance with my invention, a top section 1' of the faucet connection 1 is foldable downwardly as shown more particularly in Figs. 1A and 3 over the bottom section 1ª for the purposes hereinafter specified. As illustrated, the rubber wall portion between the faucet seat 2 and the outer surface is thinned at 5 and is preferably thickened just below said thinned portion 5 and also reinforced by ribs 6—6' so as to permit a folding of the upper section 1' downwardly and outwardly over the lower section 1ª. These faucet connections are manufactured in the form shown in Fig. 1 but preferably thereafter have the upper sections 1' folded down as shown in Figs. 1A and 3 and are shipped to the user in this condition. In attaching the connection to large-size faucets the user presses the lower portion 2' of the large folded seat portion against the bottom portion of the nozzle and then folds or extends the folded section upwardly onto said nozzle. This method enables a closer and better connection and fit to be made with the large size faucet nozzles or heads than can be obtained without such folding. When it is desired to apply the faucet connection to a connection of intermediate size, the folded top section will enable ready entrance of the faucet nozzle into the faucet seat 3 and the folding downward of the section 1' will avoid contact between the top of the large faucet-seat section and the bent portion 7ª, horizontal portion 7ᵇ of a faucet pipe 7, of smaller size, it being understood that the vertical neck portion 7' is relatively short and that the folding of the upper section of the connection 1 first enables the portion containing faucet seat 3 to approach closer to the horizontal portion 7' of the faucet 7 than would otherwise be possible and consequently enables a better connection to be obtained, and furthermore, the downward folding also reinforces the wall 3' of the seat 3 and provides for a tighter and better connection than would otherwise be possible. When it is desired to apply the connection to the still smaller faucet seat 4, the folding down of the section 1' is also very desirable to enable entrance of the nozzle or faucet head into the faucet seat or cavity 4 without interfering contact between the said upper section and the pipe as above indicated.

In the embodiment shown, I have provided the lower end of the faucet connection 1 internally with a metallic tube 10 and have at said lower end provided an external reinforcing ferrule 11 on the outer surface of the lower end thereof. The tube 10 will provide a coupling between my rubber connection and the tube or pipe of the spray device while the metallic ferrule 11 merely functions as a reinforcement. These members 10 and 11 constitute no part of my invention.

It will be understood that in addition to providing a thin portion at 5 and reinforcing ribs 6—6', the lower seat portion 2' is thickened, converging inwardly to the opening 2ᵈ while the top opening 2ª is of such size and the top rim portion 2ᵇ is of such thickness and elasticity as to permit the downward folding by taking hold with the fingers of the lip portion 2ᶜ and turning the same outwardly and downwardly. It will be seen also that the top section 1' is unobstructed by metallic rings or the like which would prevent such folding.

It will be understood from the above that I have provided a faucet connection of elastic rubber which is capable of quick and ready application to faucets of varying sizes and which is capable of gripping or having a binding action on the faucet which will not be loosened or released when the spray tube attached to the spray head is handled by the user or when a spray head, brush or nozzle is being used; that I have provided a faucet connection having a plurality of faucet seats of varying sizes and which will have a foldable section or portion capable of changing the length of the element and of converting a portion of the wall of one of the faucet seats into an external collar so as to vary the relative positions of the seats; that I have produced a connection which will provide a plurality of tops for the connection and enable close approach of plurality of faucet seats in a connection to the bent portions of faucets, thus producing closer connection to be obtained between the faucet seats in said connection and the faucets which they are intended to fit; that I have provided a connection having an elastic, foldable faucet seat portion which will, by an unfolding thereof, enable a tighter and closer fit to be obtained between the foldable seat and one of the faucets which said seat element is adapted to fit; that I have provided in a faucet connection a faucet seat having a foldable wall portion which, in folded position, will reinforce the walls of another faucet seat in the faucet connection; that I have provided a faucet connection of frustro-conical conformation which will have a relatively large faucet seat provided with a relatively thin elastic wall portion disposed above a thicker wall portion preferably having a reinforcing rib on the outer surface, whereby the upper half of the wall of a larger faucet seat will be capable of being turned down or folded to cause the outer surface thereof to surround and engage the outer surface of the wall of a smaller faucet seat in said faucet connection.

As many changes could be made in this construction and many apparently widely different embodiments of this invention could be made without departing from the scope thereof; it is intended that all matter contained in the above description or shown in the accompanying drawing shall be interpreted as illustrative and not in a limiting sense.

Having described my invention, I claim:—

1. A faucet connection formed of a hollow rubber element and provided internally with a plurality of faucet seats, said connection having an upper faucet-seat portion foldable downwardly over the connection to produce a shorter member with one of said seats in folded condition and a lower seat arranged closer to the top of the said faucet connection, said foldable faucet seat section having a relatively thin wall section to provide a bendable portion and a relatively thick unyielding portion just below said thin bendable portion.

2. A faucet connection formed of a hollow rubber element and provided internally with a plurality of faucet seats, said connection having an upper faucet seat portion foldable downwardly over the connection to produce a shorter member with one of said seats in folded condition and a lower seat arranged closer to the top of the said faucet connection, said foldable faucet seat section having a relatively thin wall section to provide a bendable portion and a relatively thick unyielding portion just below said thin bendable portion, said element being reinforced on the outer surface by ribs disposed just below said bendable portion.

3. A faucet connection formed of a hollow rubber element provided internally with a plurality of faucet seats, said connection having a faucet-seat section foldable downwardly over the connection to produce a shorter member with one of said plurality of seats in folded condition and a lower seat arranged closer to the top of the said faucet connection, said foldable upper section being folded about a relatively thin wall portion and having a relatively thick and elastic rim portion adapted when folded downwardly to abut tightly against the lower section.

4. A faucet connection formed of a hollow rubber element provided internally with a foldable faucet seat section, said element having a portion of its wall foldable downwardly over the connection to produce a tighter grip on a faucet when said folded section is folded upwardly, and said foldable faucet-seat section having a relatively thin wall-section to provide a bendable-portion and a relatively thick unyielding-portion just below said thin bendable-portion.

JOHN EDWARD CONKLIN.